United States Patent Office 3,341,519
Patented Sept. 12, 1967

3,341,519
NOVEL BENZOXAZINES, BENZOTHIAZINES, BENZOXAZEPINS AND BENZOTHIAZEPINS
John Krapcho, Somerset, N.J., assignor, by mesne assignments, to E. R. Squibb & Sons, New York, N.Y., a corporation of Delaware
No Drawing. Filed Apr. 28, 1965, Ser. No. 451,631
10 Claims. (Cl. 260—239.3)

This invention relates to new chemical compounds having valuable therapeutic properties and processes for the preparation thereof.

The therapeutically active compounds of this invention are bases of the Formula I:

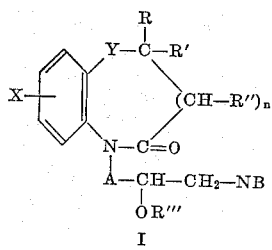

I and acid-addition salts thereof, wherein X is hydrogen, lower alkyl, lower alkoxy, lower alkyl mercapto, nitro, di(lower alkyl)amino, halo or trifluoromethyl; R, R', and R'' are each hydrogen, lower alkyl, cycloalkyl, X-substituted phenyl, furyl, thienyl, or pyridyl; Y is methylene, ethylene, oxy (—O—) or thio (—S—); $n$ is zero, one or two; A is lower alkylene(preferably methylene, ethylene and propylene); R''' is hydrogen, lower alkyl, monocyclic aryl lower alkyl, or acyl; and BN is a basic nitrogen-containing radical of less than twelve carbon atoms. Among the suitable radicals represented by the symbol BN are: amino; (lower alkyl)amino (e.g., methylamino); di(lower alkyl)amino (e.g., diethylamino, dimethylamino, and N - methyl - N - propylamino); (hydroxy-lower alkyl)amino; di(hydroxy-lower alkyl)amino; phenyl (lower alkyl)amino (e.g., benzylamino); N - (lower alkyl)—N—phenyl (lower alkyl)amino; and saturated 5 to 7 membered monocyclic heterocyclic radicals of less than twelve carbon atoms, as exemplified by piperidino; (lower alkyl)piperidino; di(lower alkyl)piperidino; (lower alkoxy)piperidino; homopiperidino; pyrrolidino; (lower alkyl)pyrrolidino; di(lower alkyl)pyrrolidino; (lower alkoxy)pyrrolidino; morpholino; (lower alkyl)morpholino; di(lower alkyl)morpholino; (lower alkoxy)morpholino; thiamorpholino; (lower alkyl)thiamorpholino; di (lower alkyl)thiamorpholino; (lower alkoxy)thiamorpholino; piperazino; homopiperazino; (lower alkyl)piperazino (e.g. $N^4$ - methylpiperazino); di(lower alkyl)piperazino; (lower alkoxy) piperazino; hydroxy-lower alkylpiperazino [e.g., $N^4$ - (2 - hydroxyethyl)piperazino]; lower alkanoyloxy - lower alkyl - piperazino [e.g., $N^4$ - (2-acetoxyethyl) - piperazino]; X-substituted phenyl piperazino [e.g., $N^4$ - (o - methoxyphenyl)piperazino]; X-substituted phenyl(lower alkyl) - piperazino (e.g., $N^4$ - phenethylpiperazino); X-substituted cinnamyl(lower alkyl) piperazino; and $N^4$ - pyridyl piperazino [e.g., $N^4$ - (2-pyridyl)piperazino]. The terms "lower alkyl," "lower alkoxy," "lower alkylene," and "lower alkanoyl," as employed herein, include both straight and branched chain radicals of less than eight carbon atoms. The preferred compounds are those wherein X is hydrogen or halo, R is hydrogen, lower alkyl or phenyl, R' and R'' are hydrogen, and R''' is hydrogen or lower alkyl. Particularly preferred are those compounds wherein X is hydrogen or chloro, R is phenyl, Y is thio, R' and R'' are hydrogen, R''' is hydrogen or acyl, $n$ is one, A is methylene, and BN is di(lower alkyl)amino or $N^4$ - methylpiperazino.

As to salts, those coming within the purview of this invention include the acid-addition salts, particularly the non-toxic acid-addition salts. Acids useful for preparing these acid-addition salts include, inter alia, inorganic acids, such as the hydrohalic acids (e.g., hydrochloric and hydrobromic acid), sulfuric acid, nitric acid, and phosphoric acid, and organic acids, such as maleic, methane sulfonic, cyclohexane sulfamic, tartaric, citric, acetic and succinic acid, theophylline and 8-chlorotheophylline.

The compounds of this invention, including the acid-addition salts thereof, are therapeutically active substances which are useful as tranquilizers and thus can be administered perorally, for example, in the same manner as Chlordiazepoxide in the treatment of irrational fears, anxiety and tension, the dosage for such treatment being adjusted for the activity of the particular compound employed.

The compounds of this invention can be prepared by condensing a compound of the Formula II:

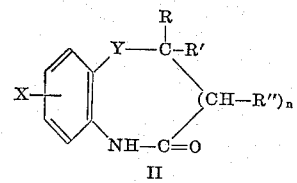

II wherein, X, R', R'', Y, and $n$ are as hereinbefore defined, with an ω-halo-epoxy (lower alkane), such as epibromohydrin, to yield new intermediates of this invention of the Formula III:

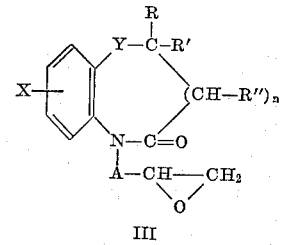

III

The resulting epoxide of the Formula III is then reacted with an amine of the formula: HNB, wherein BN is as hereinbefore defined, to yield the final products of this invention, wherein R''' is hydrogen. The free bases can be converted to their acid-addition salts in the usual manner by reaction with the desired acid.

To yield those final products wherein R''' is acyl, the corresponding free alcohols (compounds wherein R''' is hydrogen) are acylated in the usual manner by treating the free alcohol with the desired acyl chloride or acid anhydride. The preferred acylating agents are those derived from hydrocarbon carboxylic acids of less than twelve carbon atoms, as exemplified by the lower alkanoic acids (e.g., acetic, propionic, butyric and hexanoic acid), the lower alkenoic acids, the monocyclic aryl carboxylic acids (e.g., benzoic acid), the monocyclic aryl lower alkanoic acids (e.g., phenacetic and β-phenylpropionic acid), the monocyclic cycloalkane carboxylic acids, and the monocyclic cycloalkene carboxylic acids.

To yield those final products wherein R''' is lower alkyl or monocyclic aryl lower alkyl, the corresponding free alcohols are treated with a basic reagent, such as sodium hydride, to yield the corresponding salts which are then treated with the desired lower alkyl halide (e.g., methyl bromide, ethyl iodide, n-propyl iodide, and n-octyl iodide) to yield compounds wherein R''' is lower alkyl, or with the desired monocyclic aryl lower alkyl halide (e.g., benzyl bromide, β-phenethyl iodide, or α-phenethyl chloride) to yield compounds wherein R''' is monocyclic aryl lower alkyl.

The following examples illustrate the invention (all temperatures being in centigrade):

EXAMPLE 1

*2,3-dihydro-5-[2-hydroxy-3-(4 - methyl - 1 - piperazinyl) propyl]-2-phenyl-1,5-benzothiazepin-4(5H)-one, dihydrochloride*

(A) PREPARATION OF 2,3-DIHYDRO-5-(2,3-EPOXYPROPYL)-2-PHENYL-1,5-BENZOTHIAZEPIN-4-(5H)-ONE

A slurry of 7.0 g. of sodamine in 1 l. of dry toluene is treated with 45.0 g. of 2,3-dihydro-2-phenyl-1,5-benzothiazepin-4-(5H)-one and the mixture is stirred for 15 min. at room temperature. The resulting solution is treated with 26.0 g. of epibromohydrin and then heated at 35–40° for 6 hrs. The solution is cooled, treated with 200 ml. of water and the organic layer dried over magnesium sulfate. The mixture is filtered and the filtrate concentrated under reduced pressure to yield a residual syrupy material. Trituration of the latter with hexane yielded a granular solid. This material is dissolved in 200 ml. of warm benzene and cooled. The solid (unreacted starting material) is filtered and the solvent evaporated under reduced pressure to give about 38 g. of product.

(B) PREPARATION OF 2,3-DIHYDRO-5-[2-HYDROXY-3-(4-METHYL - 1 - PIPERAZINYL)-PROPYL]-2-PHENYL-1,5-BENZOTHIAZEPIN-4-(5H)-ONE, DIHYDROCHLORIDE

A solution of 38 g. of material from part (A) and 50 g. of N-methylpiperazine in 350 ml. of toluene is refluxed for 8 hrs. The volatile material from the mixture is removed by heating to 65° at 2 mm., the residue is dissolved in 500 ml. of benzene and this solution is washed with 100 ml. portions of water (five times). The organic phase is then extracted with a solution of 32 ml. of concentrated hydrochloric acid in 350 ml. of water. The aqueous phase is cooled, treated with a cold solution of 23 g. of sodium hydroxide in 75 ml. of water and the mixture extracted with ether several times. The ether layers are combined, dried over magnesium sulfate and filtered. Evaporation of the solvent gives 4.0 g. of residue. The latter is dissolved in 20 ml. of ethanol, treated with 4 ml. of 5.9 N alcoholic hydrogen chloride and diluted to 500 ml. with ether to give about 4.5 g. of solid, M.P. about 212–215° (dec.).

After crystallization from 60 ml. of isopropyl alcohol, this colorless product weighs about 2.2 g., M.P. about 235–237° (dec.).

EXAMPLE 2

*2,3-dihydro-5-[2-hydroxy - 3 - dimethylaminopropyl] - 2-phenyl-1,5-benzothiazepin-4(5H)-one, dihydrochloride*

Following the procedure of Example 1, part (B), but substituting an equivalent amount of dimethylamine for the N-methylpiperazine, 2,3-dihydro-5-[2-hydroxy-3-dimethylaminopropyl] - 2 - phenyl - 1,5 - benzothiazepin-4(5H)-one dihydrochloride is obtained.

EXAMPLE 3

*2,3-dihydro-5-[3-hydroxy-4-(4-methyl - 1 - piperazinyl) butyl]-2-phenyl-1,5-benzothiazepin - 4(5H) - one, dihydrochloride*

Following the procedure of Example 1, but substituting an equivalent amount of 1,2-epoxy-4-bromobutane for the epibromohydrin in part A, 2,3-dihydro-5-[3-hydroxy-4-(4-methyl-1-piperazinyl)-butyl]-2-phenyl - 1,5 - benzothiazepin-4(5H)-one dihydrochloride is obtained.

EXAMPLE 4

*2,3-dihydro-5-[2-hydroxy-3-(4 - methyl - 1 - piperazinyl) propyl]-2-phenyl-1,5-benzoxazepin - 4(5H) - one, dihydrochloride*

By substituting an equivalent amount of 2,3-dihydro-2-phenyl-1,5-benzoxazepin - 4 - (5H) - one, M.P. 123–125° (prepared as described in Example 1 of U.S. patent application, Ser. No. 328,048, filed Dec. 4, 1963), for the 2,3-dihydro-2-phenyl-1,5-benzothiazepin-4-one in part (A) of Example 1, and carrying out the procedure of the example, there is obtained 2,3-dihydro-5-[2-hydroxy-3-(4-methyl-1-piperazinyl)propyl]-2-phenyl-1,5-benzoxazepin-4(5H)-one dihydrochloride.

EXAMPLE 5

*3,4 - dihydro - 1-[2-hydroxy-3-(4-methyl - 1-piperazinyl) propyl]-4-phenyl - 1 - benzazepin - 2(3H)one, dihydrochloride*

By substituting an equivalent amount of 1,3,4,5-tetrahydro-4-phenyl-2H-1-benzazepine-2-one, M.P. 140–142° (prepared as described in Example 13 of U.S. patent application, Serial No. 418,910, filed December 16, 1964), for the 2,3-dihydro-2-phenyl-1,5-benzothiazepin-4-one in part (A) of Example 1 and carrying out the procedure of the example, there is obtained 3,4-dihydro-1-[2-hydroxy - 3-(4-methyl-1-piperazinyl)propyl] - 4-phenyl - 1-benzazepin-2(3H)-one dihydrochloride.

EXAMPLE 6

*3,4,5,6 - tetrahydro - 1-[2 - hydroxy-3-(4-methyl-1-piperazinyl-propyl] - 4 - phenyl - 1 - benzazocin - 2(3H)-one, dihydrochloride*

By substituting an equivalent amount of 3,4,5,6-tetrahydro-4-phenyl-1-benzazocin-2(H)-one, M.P. 188–189° (prepared as described in Example 1 of U.S. patent application, Ser. No. 418,910, filed Dec. 16, 1964), for the 2,3-dihydro-2-phenyl-1,5-benzothiazepin-4-one in part (A) of Example 1 and carrying out the procedure of the example, there is obtained 3,4,5,6-tetrahydro-1-[2-hydroxy-3-(4-methyl-1-piperazinyl)propyl] - 4 - phenyl - 1 - benzazocin-2(3H)-one dihydrochloride.

EXAMPLE 7

*2,3 - dihydro - 4 - [2 - hydroxy-3-(4-methyl-1-piperazinyl) propyl] - 2 - phenyl - 1,4-benzothiazin-3(2H)-one, dihydrochloride*

By substituting an equivalent amount of 3,4-dihydro-2-phenyl-2H-1,4-benzothiazin-3-one for the 2,3-dihydro-2-phenyl-1,5-benzothiazepin-4-one in part (A) of Example 1 and carrying out the procedure of the example, there is obtained 2,3-dihydro-4-[2-hydroxy-3-(4-methyl-1-piperazinyl)-propyl]-2-phenyl - 1,4-benzothiazin-3(2H)-dihydrochloride.

EXAMPLE 8

*3,4-dihydro-6-[2 - hydroxy - 3 - (4 - methyl - 1 - piperazinyl)propyl] - 2 - phenyl - 1,6-benzothiazocin-5(6H)-one, dihydrochloride*

By substituting an equivalent amount of 3,4-dihydro-2-phenyl-2H-1,6-benzothiazocin-5(6H)-one for the 2,3-dihydro-2-phenyl-1,5-benzothiazepin-4-one in part (A) of Example 1 and carrying out the procedure of the example, there is obtained 3,4-dihydro-6-[2-hydroxy-3-(4-methyl - 1 - piperazinyl) - propyl] - 2 - phenyl - 1,6-benzothiazocin-5(6H)-one dihydrochloride.

Similarly, by substituting the following reactants for the 2,3-dihydro-2-phenyl-1,5-benzothiazepin-4-one in part (A) of Example 1 and carrying out the procedure of the example, the corresponding N-[2-hydroxy-3-(4-methyl-1- piperazinyl)propyl] derivative is obtained in the form of its dihydrochloride salt:

| Example | Reactant |
|---|---|
| 9 | 4,5-dihydro-3-phenyl-1-H-1-benzazepin-2(3H)-one. |
| 10 | 3,4,5,6-tetrahydro-4-(o-chlorophenyl)-1-benzazocine-2(1H)-one. |
| 11 | 3,4,5,6-tetrahydro-4-o-tolyl-1-benzazocin-2(H)-one. |
| 12 | 4,5-dihydro-3-o-methoxyphenyl-1H-1-benzazepin-2(3H)-one. |
| 13 | 4,5-dihydro-3-(p-methoxyphenyl)-8-methyl-1H,1-benzazepin-2(3H)-one. |
| 14 | 2-methyl-2,3-dihydro-1, 5-benzoxazepine-4-one. |
| 15 | 2,3-dihydro-2-(p-methoxyphenyl)-1,5-benzoxazepin-4-one. |
| 16 | 2,3-dihydro-1,5-benzoxazepin-4-one. |
| 17 | 2,3-dihydro-2-benzyl-1,5-benzoxazepin-4-one. |
| 18 | 2,3-dihydro-2-(α-furyl)-1,5-benzoxazepin-4-one. |
| 19 | 7-chloro-2,3-dihydro-2-phenyl-1,5-benzoxazepin-4-one. |
| 20 | 7-methyl-2,3-dihydro-2-phenyl-1,5-benzoxazepin-4-one. |
| 21 | 7-methoxy-2,3-dihydro-2-phenyl-1,5-benzoxazepin-4-one. |
| 22 | 7-(trifluoromethyl)-2,3-dihydro-2-phenyl-1,5-benzoxazepin-4-one. |
| 23 | 7-(methylmercapto)-2,3-dihydro-1,5-benzothiazepin-4-one. |

Similarly, by substituting other amines for the N-methylpiperazine in part (B) of Example 1, the indicated 2,3 - dihydro - 5 - [2-hydroxy-3-(Z-substituted) propyl]-2-phenyl-1,5-benzothiazepin-4(5H)-one dihydrochloride is obtained:

| Ex. | Reactant | Product (Z is—) |
|---|---|---|
| 24 | Pyrrolidine | Pyrrolidino. |
| 25 | N-methyl-N-phenethylamine | N.methyl-N-phenethylamino. |
| 26 | Morpholine | Morpholino. |
| 27 | Piperidine | Piperidino. |
| 28 | N-methyl-N-cyclopropyl-amine. | N-methyl-N-cyclopropyl-amino. |
| 29 | Diethylamine | Diethylamino. |
| 30 | 4-(o-ethylthiophenyl)-piperazine. | 4-(o-ethylthiophenyl)-piperazino. |
| 31 | 4-(2-pyridyl)piperazine | 4-(2-pyridyl)piperazino. |
| 32 | 4-cinnamylpiperazine | 4-cinnamylpiperazino. |

EXAMPLE 33

*2,3 - dihydro - 5 - [2-acetoxy-3-(4-methyl-1-piperazinyl) propyl] - 2 - phenyl - 1,5-benzothiazepin-4(5H)-one, dihydrochloride*

A mixture of 2.0 g. of material from Example 1 and 10 ml. of acetic anhydride is refluxed for 1 hr., cooled and diluted with 100 ml. of ether to give a colorless product.

Similarly, by substituting any of the compounds obtained in Examples 2 through 32 for the benzothiazepin-4-one in Example 33, the corresponding acetic acid ester is formed. Moreover, if another acylating agent, such as propionic anhydride and benzoyl chloride, is substituted for the acetic anhydride in the procedure of Example 33, the corresponding ester is formed.

EXAMPLE 34

*2,3 - dihydro - 5 - [2 - ethoxy - 3-(4-methyl-1-piperazinyl) propyl] - 2 - phenyl - 1,5 - benzothiazepin - 4(5H)-one, dihydrochloride*

A solution of 5.0 g. of material from Example 1 in 25 ml. of water is treated with 3.0 g. of potassium carbonate and the liberated base is extracted with 200 ml. of ether. The ether solution is dried over magnesium sulfate, filtered and filtrate concentrated to remove solvent. The residue is dissolved in 200 ml. of toluene and treated with 0.24 g. of sodium hydride. The mixture is stirred for 1 hr. at room temperature, treated with 1.6 g. of ethyl iodide and then heated at 60–70° for 3 hrs. The mixture is cooled, treated with 20 ml. of water and the organic phase dried over magnesium sulfate. The mixture is filtered and the filtrate concentrated under reduced pressure. The residue is dissolved in 25 ml. of ethanol and treated with a slight excess of alcoholic hydrogen chloride. Dilution of this solution with 200 ml. of ether gives the solid dihydrochloride salt.

Similarly, by sustituting any of the compounds obtained in Examples 2 through 32 for the benzothiazepin-4-one in Example 34, the corresponding ethyl ether is formed. Moreover, if another alkylating agent is substituted for the ethyl iodide in Example 34, the corresponding alkyl ether is produced.

EXAMPLE 35

*2,3-dihydro-5-[2-benzyloxy-3-(4-methyl - 1 - piperazinyl) propyl] - 2 - phenyl-1,5-benzothiazepin-4(5H)-one, dihydrochloride*

By substituting 1.3 g. of benzyl chloride for the ethyl iodide in Example 34, there is obtained 2,3-dihydro-5-[2-benzyloxy-3-(4-methyl - 1 - piperazinyl) - propyl] - 2-phenyl-1,5-benzothiazepin-4(5H)-one, dihydrochloride.

The invention may be variously otherwise embodied within the scope of the appended claims.

What is claimed is:

1. A compound selected from the group consisting of bases of the formula

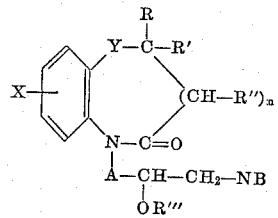

and pharmaceutically-acceptable acid-addition salts thereof, wherein X is selected from the group consisting of hydrogen, lower alkyl, lower alkoxy, lower alkyl mercapto, nitro, di(lower alkyl)amino, halo and trifluoromethyl; R, R' and R" are each selected from the group consisting of hydrogen, lower alkyl, cycloalkyl of less than seven carbon atoms, X-substituted phenyl, furyl, thienyl and pyridyl; Y is selected from the group consisting of methylene, ethylene, oxy and thio; $n$ is selected from the group consisting of zero, one and two; A is lower alkylene; R''' is selected from the group consisting of hydrogen, lower alkyl, phenyl lower alkyl and the acyl radical of a carboxylic acid of less than twelve carbon atoms; and BN is selected from the group consisting of amino, lower alkylamino, di(lower alkyl)amino, (hydroxy-lower alkyl)amino, di(hydroxy-lower alkyl)amino, phenyl(lower alkyl)amino, N-(lower alkyl)-N-phenyl (lower alkyl)amino, piperidino, (lower alkyl)piperidino, di(lower alkyl)piperidino, (lower alkoxy)piperidino, homopiperidino, pyrrolidino, (lower alkyl)pyrrolidino, di(lower alkyl)pyrrolidino, (lower alkoxy)pyrrolidino, morpholino, (lower alkyl)morpholino, di(lower alkyl) morpholino, (lower alkoxy)morpholino, thiamorpholino (lower alkyl)thiamorpholino, di(lower alkyl)thiamorpholino, (lower alkoxy)thiamorpholino, piperazino, homopiperazino, (lower alkyl)piperazino, di(lower alkyl) piperazine, (lower alkoxy)piperazino, hydroxy-lower alkylpiperazino, lower alkanoyloxy-lower alkylpiperazino, X - substituted phenylpiperazino, X - substituted phenyl (lower alkyl)piperazino, X-substituted cinnamyl(lower alkyl)piperazino and $N^4$-pyridylpiperazino.

2. 2,3-dihydro-5-[ω-hydroxy-ω-[di(lower alkyl)aminomethyl](lower alkyl)]-2-phenyl-1,5-benzothiazepin-4(5H)-one.

3. A pharmaceutically-acceptable acid-addition salt of the compound of claim 2.

4. 2,3-dihydro-5-[3-hydroxy-3-(4-methyl-1-piperazinyl)propyl]-2-phenyl-1,5-benzothiazepin-4(5H)-one.

5. A pharmaceutically-acceptable acid-addition salt of compound of claim 4.

6. A pharmaceutically-acceptable acid-addition salt of 2,3-dihydro-5-[2-hydroxy-3-dimethylaminopropyl]-2-phenyl-1,5-benzothiazepin-4(5H)-one.

7. A compound of the formula

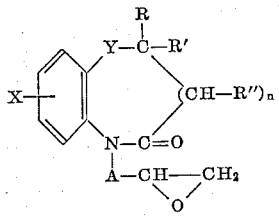

wherein X is selected from the group consisting of hydrogen, lower alkyl, lower alkoxy, lower alkyl mercapto, nitro, di(lower alkyl)amino, halo and trifluoromethyl; A is lower alkylene; R, R' and R'' are each selected from the group consisting of hydrogen, lower alkyl, cycloalkyl of less than seven carbon atoms, X-substituted phenyl, furyl, thienyl and pyridyl; Y is selected from the group consisting of methylene, ethylene, oxy and thio; and $n$ is selected from the group consisting of zero, one and two.

8. 2,3-dihydro-5-(2,3-epoxypropyl)-2-phenyl-1,5-benzothiazepin-4(5H)-one.

9. A process for preparing a compound of claim 1, which comprises interacting a compound of the formula

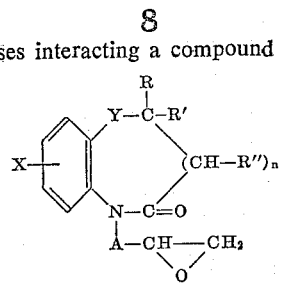

with a compound of the formula: BNH, wherein X, A, R, R', R'', Y, $n$ and BN are as defined in claim 1.

10. A process for preparing a compound of claim 7, which comprises interacting a compound of the formula

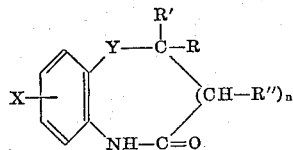

wherein X, A, R, R', R'', Y and $n$ are as defined in claim 7 with a compound of the formula:

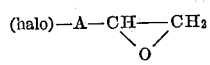

wherein A is lower alkylene.

No references cited.

WALTER A. MODANCE, *Primary Examiner.*
ROBERT T. BOND, *Assistant Examiner.*